United States Patent
Nagao et al.

(10) Patent No.: US 9,988,490 B2
(45) Date of Patent: Jun. 5, 2018

(54) METHOD FOR PRODUCING POLYCARBONATE

(71) Applicant: IDEMITSU KOSAN CO., LTD., Tokyo (JP)

(72) Inventors: Yukiko Nagao, Tokyo (JP); Masayuki Takahashi, Taipei (TW); Kota Mabuchi, Narashino (JP)

(73) Assignee: IDEMITSU KOSAN CO., LTD., Tokyo (JP)

( * ) Notice: Subject to any disclaimer, the term of this patent is extended or adjusted under 35 U.S.C. 154(b) by 0 days. days.

(21) Appl. No.: 15/314,406

(22) PCT Filed: May 28, 2015

(86) PCT No.: PCT/JP2015/065388
§ 371 (c)(1),
(2) Date: Nov. 28, 2016

(87) PCT Pub. No.: WO2015/182700
PCT Pub. Date: Dec. 3, 2015

(65) Prior Publication Data
US 2017/0198091 A1 Jul. 13, 2017

(30) Foreign Application Priority Data
May 30, 2014 (JP) .................................. 2014-113430

(51) Int. Cl.
| C08G 64/00 | (2006.01) |
| C08G 64/16 | (2006.01) |
| C08J 3/12 | (2006.01) |
| C08G 64/40 | (2006.01) |
| B29B 9/12 | (2006.01) |
| B29K 69/00 | (2006.01) |
| B29K 105/00 | (2006.01) |

(52) U.S. Cl.
CPC ............ C08G 64/1608 (2013.01); B29B 9/12 (2013.01); C08G 64/406 (2013.01); C08J 3/12 (2013.01); *B29K 2069/00* (2013.01); *B29K 2105/251* (2013.01); *C08J 2369/00* (2013.01)

(58) Field of Classification Search
CPC .................................................. C08G 64/1608
USPC .................................................. 528/196, 198
See application file for complete search history.

(56) References Cited

U.S. PATENT DOCUMENTS 5,760,160 A * 6/1998 Isshiki ....................... C08J 3/12
528/196

FOREIGN PATENT DOCUMENTS

| JP | H06-256498 A | 9/1994 |
| JP | H07-316283 A | 12/1995 |
| JP | H09-278875 A | 10/1997 |
| WO | WO-2007/132874 A1 | 11/2007 |

OTHER PUBLICATIONS

International Search Report issued in International Patent Application No. PCT/JP2015/065388 dated Jul. 21, 2015.

* cited by examiner

Primary Examiner — Terressa Boykin
(74) Attorney, Agent, or Firm — Foley & Lardner LLP

(57) ABSTRACT

Provided is a method of producing a polycarbonate that enables efficient drying of a polycarbonate powder and has no risk of deteriorating the quality of a polycarbonate molded article to be obtained. The method of producing a polycarbonate includes: a step of causing an alkali aqueous solution of a dihydric phenol and phosgene to react with each other in the presence of an organic solvent to produce an organic solvent solution containing a polycarbonate; a powdering step of powdering the organic solvent solution containing the polycarbonate to provide a polycarbonate powder; and a pre-drying step of drying the polycarbonate powder to remove the remaining organic solvent, in which a drying temperature in the pre-drying step is set to a temperature lower than the glass transition temperature of the polycarbonate containing 1.5 mass % of the organic solvent by from 5° C. to 15° C.

12 Claims, No Drawings

METHOD FOR PRODUCING POLYCARBONATE

CROSS-REFERENCE TO RELATED APPLICATIONS

The present application is a U.S. national stage application of International Patent Application No. PCT/JP2015/065388, filed May 28, 2015, which claims the benefit of priority to Japanese Patent Application No. 2014-113430, filed May 30, 2014, the entireties of which are hereby incorporated by reference.

TECHNICAL FIELD

The present invention relates to a method of producing a polycarbonate, and more specifically, to a method of producing a polycarbonate in which a remaining organic solvent is efficiently removed from a polycarbonate powder obtained by powdering an organic solvent solution containing a polycarbonate, which is obtained by causing an alkali aqueous solution of a dihydric phenol and phosgene to react with each other in the presence of the organic solvent.

BACKGROUND ART

A polycarbonate has excellent characteristics, such as transparency, heat resistance, and mechanical characteristics, and hence has been used in a wide variety of applications including: casings for an OA apparatus and a home electrical appliance; members in electrical and electronic fields; optical materials, such as various optical disc substrates and lenses; carport roof materials; and various construction materials. In addition, the production amount, and number of applications, of the polycarbonate have been increasing. Therefore, a production method providing high productivity has been required in the production of the polycarbonate.

An interfacial polycondensation method or an ester exchange method has been known as a method of producing the polycarbonate. However, the interfacial polycondensation method involving using a halogen-based organic solvent, such as methylene chloride, has been mainstream in terms of a problem concerning quality or the like.

In the method of producing the polycarbonate based on the interfacial polycondensation method, a polycarbonate powder is obtained as described below. An alkali aqueous solution of a dihydric phenol and phosgene are caused to react with each other in the presence of an organic solvent. An organic solvent solution containing a polycarbonate obtained after the reaction is introduced into a kneader or the like, and is powdered by removing the organic solvent. Then, the resultant powder is pulverized as required. The polycarbonate powder thus obtained contains the used organic solvent at a content as large as from 10 mass % to 50 mass %, and hence the remaining organic solvent has been removed by subjecting the powder to a drying treatment.

As the drying method, in, for example, Patent Document 1, there is a disclosure that a drying treatment is performed at a temperature less than the glass transition temperature of an aromatic polycarbonate resin. In Patent Document 1, there is a disclosure that the drying treatment is performed at a temperature less than the glass transition temperature of the polycarbonate resin, but in Examples thereof, an organic solvent is removed by performing the drying treatment at 145° C. in order that a polycarbonate resin having a glass transition temperature of 149.3° C. may be obtained. When the drying is performed at a temperature that differs from the glass transition temperature by as small as 4.3° C. as described above, a polycarbonate powder fuses to a wall surface in a drying machine to reduce the heat transfer performance of the drying machine, and hence its drying performance reduces in some cases. In addition, the polycarbonate that has adhered to the wall surface in the drying machine peels off in some cases. In particular, when the polycarbonate that has adhered at the time of the production of a high-molecular weight polycarbonate peels off during the drying treatment of a low-molecular weight polycarbonate after the switching of a grade, a problem in that a gel occurs in a molded article to deteriorate the quality of the molded article occurs.

CITATION LIST

Patent Document

[Patent Document 1] JP 06-256498 A

SUMMARY OF INVENTION

Technical Problem

An object of the present invention is to provide a method of producing a polycarbonate that enables efficient drying of a polycarbonate powder and has no risk of deteriorating the quality of a polycarbonate molded article to be obtained.

Solution to Problem

The inventors of the present invention have made extensive investigations, and as a result, have found that in the removal of a remaining organic solvent from a polycarbonate powder obtained by powdering an organic solvent solution containing a polycarbonate, which is obtained by causing an alkali aqueous solution of a dihydric phenol and phosgene to react with one another in the presence of organic solvent, when the temperature at which the polycarbonate powder is dried is set to a temperature lower than the glass transition temperature of the polycarbonate containing a specific amount of the organic solvent by a value in a specific range, adhesion due to the fusion of the polycarbonate powder to a wall surface in a drying machine can be suppressed, and hence the object can be achieved. Thus, the inventors have completed the present invention.

That is, the present invention relates to the following items [1] to [12].

[1] A method of producing a polycarbonate, comprising:
a step of causing an alkali aqueous solution of a dihydric phenol and phosgene to react with each other in the presence of an organic solvent to produce an organic solvent solution containing a polycarbonate;
a powdering step of powdering the organic solvent solution containing the polycarbonate to provide a polycarbonate powder; and
a pre-drying step of drying the resultant polycarbonate powder to remove the remaining organic solvent,
in which a drying temperature in the pre-drying step is set to a temperature lower than a glass transition temperature of the polycarbonate containing 1.5 mass % of the organic solvent by from 5° C. to 15° C.

[2] The method of producing a polycarbonate according to Item [1], wherein a content of the organic solvent in the polycarbonate powder obtained in the powdering step is from 10 mass % to 50 mass %.

[3] The method of producing a polycarbonate according to Item [1] or [2], wherein a content of the organic solvent in the polycarbonate powder after the pre-drying step is from 1 mass % to 3 mass %.

[4] The method of producing a polycarbonate according to any one of Items [1] to [3], wherein the organic solvent is methylene chloride.

[5] The method of producing a polycarbonate according to any one of Items [1] to [4], wherein the polycarbonate powder obtained in the powdering step has an average particle diameter of from 0.15 mm to 2.40 mm.

[6] The method of producing a polycarbonate according to any one of Items [1] to [5], wherein the polycarbonate contained in the organic solvent solution has a viscosity-average molecular weight of from 8,000 to 35,000.

[7] The method of producing a polycarbonate according to any one of Items [1] to [6], further comprising, after the pre-drying step, a post-drying step of drying the polycarbonate powder.

[8] The method of producing a polycarbonate according to Item [7], wherein a content of the organic solvent in the polycarbonate powder obtained after the post-drying step is set to 1,000 ppm by mass or less.

[9] The method of producing a polycarbonate according to Item [7] or [8], wherein a content of the organic solvent in the polycarbonate powder obtained after the post-drying step is set to 500 ppm by mass or less.

[10] The method of producing a polycarbonate according to any one of Items [7] to [9], wherein a drying temperature in the post-drying step is set to a temperature lower than a glass transition temperature of the polycarbonate substantially free of the organic solvent by from 3° C. to 10° C.

[11] The method of producing a polycarbonate according to any one of Items [7] to [10], wherein an average number of gels in a film measuring 10 cm by 30 cm, and having a thickness of 0.1 mm, the film being obtained by molding the polycarbonate powder obtained after the post-drying step, is 0.7 or less.

[12] The method of producing a polycarbonate according to any one of Items [1] to [11], wherein the dihydric phenol is bisphenol A.

Advantageous Effects of Invention

According to the present invention, in the removal of a remaining organic solvent from a polycarbonate powder, the temperature at which the polycarbonate powder is dried is set to an appropriate temperature, and hence the polycarbonate powder does not fuse to a wall surface in a drying machine. Accordingly, the polycarbonate powder can be efficiently dried and there is no risk of the deterioration of the quality of a polycarbonate molded article to be obtained.

DESCRIPTION OF EMBODIMENTS

A method of producing a polycarbonate of the present invention is a method of producing a polycarbonate including: a step of causing an alkali aqueous solution of a dihydric phenol and phosgene to react with each other in the presence of an organic solvent to produce an organic solvent solution containing a polycarbonate; a powdering step of powdering the organic solvent solution containing the polycarbonate to provide a polycarbonate powder; and a pre-drying step of drying the resultant polycarbonate powder to remove the remaining organic solvent, in which a drying temperature in the pre-drying step is set to a temperature lower than the glass transition temperature of the polycarbonate containing 1.5 mass % of the organic solvent by from 5° C. to 15° C.

The method of producing a polycarbonate of the present invention is described in detail below. In this description, a specification considered to be preferred can be arbitrarily adopted, and a combination of preferred specifications can be said to be more preferred.

[Step of Producing Organic Solvent Solution Containing Polycarbonate]

In the method of producing a polycarbonate of the present invention, the organic solvent solution containing the polycarbonate is used. The organic solvent solution containing the polycarbonate is obtained by causing the alkali aqueous solution of the dihydric phenol and phosgene to react with each other in the presence of the organic solvent. A process up to the obtainment of the organic solvent solution containing the polycarbonate is described.

<Alkali Aqueous Solution of Dihydric Phenol>

The dihydric phenol to be used in the present invention is not particularly limited, but a dihydric phenol represented by the following general formula (1) is preferably used.

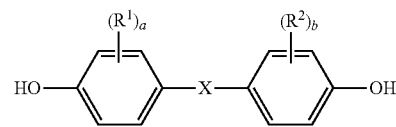

wherein, $R^1$ and $R^2$ each independently represent a halogen atom, an alkyl group having 1 to 6 carbon atoms, or an alkoxy group having 1 to 6 carbon atoms, X represents a single bond, an alkylene group having 1 to 8 carbon atoms, an alkylidene group having 2 to 8 carbon atoms, a cycloalkylene group having 5 to 15 carbon atoms, a cycloalkylidene group having 5 to 15 carbon atoms, a fluorenediyl group, an arylalkylene group having 7 to 15 carbon atoms, an arylalkylidene group having 7 to 15 carbon atoms, —S—, —SO—, —SO$_2$—, —O—, or —CO—, and a and b each independently represent an integer of from 0 to 4.

The dihydric phenol represented by the general formula (1) is not particularly limited, but 2,2-bis(4-hydroxyphenyl)propane [trivial name: bisphenol A] is suitable.

Examples of the dihydric phenol except bisphenol A include: bis(hydroxyaryl)alkanes, such as bis(4-hydroxyphenyl)methane, 1,1-bis(4-hydroxyphenyl)ethane, 2,2-bis(4-hydroxyphenyl)butane, 2,2-bis(4-hydroxyphenyl)octane, bis(4-hydroxyphenyl)phenylmethane, bis(4-hydroxyphenyl)diphenylmethane, 2,2-bis(4-hydroxy-3-methylphenyl)propane, bis(4-hydroxyphenyl)naphthylmethane, 1,1-bis(4-hydroxy-t-butylphenyl)propane, 2,2-bis(4-hydroxy-3-bromophenyl)propane, 2,2-bis(4-hydroxy-3,5-dimethylphenyl)propane, 2,2-bis(4-hydroxy-3-chlorophenyl)propane, 2,2-bis(4-hydroxy-3,5-dichlorophenyl)propane, and 2,2-bis(4-hydroxy-3,5-dibromophenyl)propane; bis(hydroxyaryl)cycloalkanes, such as 1,1-bis(4-hydroxyphenyl)cyclopentane, 1,1-bis(4-hydroxyphenyl)cyclohexane, 1,1-bis(4-hydroxyphenyl)-3,5,5-trimethylcyclohexane, 2,2-bis(4-hydroxyphenyl)norbornane, and 1,1-bis(4-hydroxyphenyl)cyclododecane; dihydroxyaryl ethers, such as 4,4'-dihydroxydiphenyl ether and 4,4'-dihydroxy-3,3'-dimethylphenyl ether; dihydroxydiaryl sulfides, such as 4,4'-dihydroxydiphenyl sulfide and 4,4'-dihydroxy-3,3'-dimethyldiphenyl sulfide; dihydroxydiaryl sulfoxides, such as 4,4'-dihydroxydiphenyl sulfoxide and 4,4'-dihydroxy-3,3'-dimethyldiphenyl sulfoxide; dihydroxydiaryl sulfones, such as 4,4'-dihydroxydiphenyl sulfone and 4,4'-dihydroxy-3,3'-dimethyldiphenyl sulfone; dihydroxydiphenyls, such as 4,4'-dihydroxydiphenyl; dihydroxydiarylfluorenes, such as 9,9-bis(4-hydroxyphenyl) fluorene and 9,9-bis(4-hydroxy-3-methylphenyl) fluorene; dihydroxydiaryladamantanes, such as 1,3-bis(4-hydroxyphenyl)adamantane, 2,2-bis(4-hydroxyphenyl)adamantane, and 1,3-bis (4-hydroxyphenyl)-5,7-dimethyladamantane; 4,4'-[1,3-phenylenebis(1-methylethylidene)]bisphenol; 10,10-bis(4-hydroxyphenyl)-9-anthrone; and 1,5-bis(4-hydroxyphenylthio)-2,3-dioxapentane.

Each of those dihydric phenols may be used alone, or two or more thereof may be used as a mixture. The dihydric phenol represented by the general formula (1), and one or both of a polyorganosiloxane and a branching agent can be used in combination.

The dihydric phenol is used as an alkali aqueous solution, and an alkali to be used at this time may be, for example, an alkali hydroxide, in particular, a strongly basic hydroxide, such as sodium hydroxide or potassium hydroxide. In normal cases, an alkali aqueous solution having an alkali concentration of from 1 mass % to 15 mass % is preferably used as the alkali aqueous solution. In addition, the content of the dihydric phenol in the alkali aqueous solution is typically selected from the range of from 0.5 mass % to 20 mass %.

<Phosgene>

Phosgene is a compound obtained by causing chlorine and carbon monoxide to react with each other at a ratio of carbon monoxide of typically from 1.01 mol to 1.3 mol with respect to 1 mol of chlorine, and activated carbon is used as a catalyst at the time of the reaction. When phosgene is used as a gas, a phosgene gas containing about 1 vol % to about 30 vol % of unreacted carbon monoxide can be used. Phosgene in a liquefied state can also be used.

<Organic Solvent>

The organic solvent is, for example, a solvent that dissolves a polycarbonate. Specific examples thereof include halogenated hydrocarbon solvents, such as dichloromethane (methylene chloride), dichloroethane, trichloroethane, tetrachloroethane, pentachloroethane, hexachloroethane, dichloroethylene, chlorobenzene, and dichlorobenzene. Among them, dichloromethane (methylene chloride) is particularly preferred.

<Production of Organic Solvent Solution Containing Polycarbonate>

The organic solvent solution containing the polycarbonate to be used in the present invention can be obtained from a reaction mixture liquid obtained by causing the alkali aqueous solution of the dihydric phenol and phosgene described above to react with each other in the presence of the organic solvent. Examples of a method of obtaining the reaction mixture liquid may include the following two methods (1) and (2):

(1) a method (oligomer method) involving causing the alkali aqueous solution of the dihydric phenol and phosgene described above to react with each other in the presence of the organic solvent to produce a polycarbonate oligomer (sometimes referred to as "PC oligomer"), and then causing the PC oligomer and the alkali aqueous solution of the dihydric phenol described above to react with each other to produce the reaction mixture liquid; and (2) a method (batch method) involving causing the alkali aqueous solution of the dihydric phenol and phosgene described above to react with each other in the presence of the organic solvent to produce the reaction mixture liquid.

First, the oligomer method of the (1) is described.

In order to produce the PC oligomer, the alkali aqueous solution of the dihydric phenol, phosgene, and the organic solvent are introduced into a reactor and caused to react with one another. In this case, the usage amount of the organic solvent is desirably selected so that a volume ratio between an organic solvent phase and an aqueous phase may be from 5/1 to 1/7, preferably from 2/1 to 1/4. In the reactor, heat is generated by, for example, a reaction in which a terminal group of the dihydric phenol is turned into a chloroformate by phosgene and a reaction in which phosgene is decomposed by the alkali, and hence the temperature of a reaction product increases. Accordingly, the reaction product is preferably cooled so that its temperature may be from 0° C. to 50° C., more preferably from 5° C. to 40° C. In addition, phosgene is preferably used so that the usage amount of phosgene may be from 1.1 mol to 1.5 mol with respect to 1 mol of the dihydric phenol, i.e., the usage amount may be excessive. A reaction liquid obtained by the reaction is separated into an aqueous phase and an organic phase, and hence the organic phase containing the PC oligomer is obtained. The PC oligomer in the organic phase thus obtained has a weight-average molecular weight of typically 5,000 or less, and has a polymerization degree of typically 20 or less, preferably from 2 to 10.

At the time of the production of the PC oligomer, one or two or more of catalysts, such as a tertiary amine (e.g., triethylamine or tributylamine) and a quaternary ammonium salt (e.g., trimethylbenzylammonium chloride or triethylbenzylammonium chloride), can also be used for accelerating the reaction. Further, a terminal stopper to be used as a molecular weight modifier for a polycarbonate may be used. Examples of a compound to be used as the terminal stopper may include monohydric phenols, such as phenol, p-cresol, p-tert-butylphenol, p-tert-octylphenol, p-cumylphenol, 3-pentadecylphenol, bromophenol, tribromophenol, and nonylphenol. Among them, p-tert-butylphenol, p-cumylphenol, and phenol are preferred in terms of, for example, economical efficiency and ease of availability. In addition, the use of 3-pentadecylphenol can significantly improve the flowability of a polycarbonate to be obtained.

The reactor to be used at the time of the production of the PC oligomer is preferably a static mixer. The stationary mixer is preferably a tubular reactor having in itself an element having an action of dividing, converting, or reversing a fluid. In addition, when a stirring tank having a stirring machine is used after the static mixer, oligomerization can be accelerated. Accordingly, such reactors are preferably used in combination.

The reaction liquid containing the PC oligomer is obtained by the method of the (1) described above, and the reaction liquid is separated into the organic phase containing the PC oligomer and the aqueous phase by using separating means, such as settled separation. The organic phase containing the PC oligomer is a solution obtained by dissolving the PC oligomer in the used organic solvent. The organic phase containing the PC oligomer is used in a polycondensation reaction to be described later.

The polycondensation reaction is as follows: the polycarbonate oligomer and the dihydric phenol are subjected to interfacial polycondensation in the presence of a molecular weight modifier (terminal stopper) to be used as desired, a catalyst to be used as desired, an alkali aqueous solution, and an organic solvent.

Specifically, the organic phase containing the polycarbonate oligomer described above, the terminal stopper to be used as desired, the catalyst to be used as desired, the organic solvent, the alkali aqueous solution, and the alkali aqueous solution of the dihydric phenol are mixed, and the mixture is subjected to interfacial polycondensation at a temperature in the range of typically from 0° C. to 50° C., preferably from 5° C. to 40° C. In addition, at the time of the polycondensation reaction, a copolymerized polycarbonate may be produced by using a polyorganosiloxane, or a branched polycarbonate may be produced by using a branching agent, such as 1,1,1-tris(4-hydroxyphenyl)ethane.

Examples of the alkali of the alkali aqueous solution, the organic solvent, the terminal stopper, and the catalyst to be used in the polycondensation reaction may include the same materials as those described in the production of the polycarbonate oligomer. In addition, a volume ratio between an organic solvent phase and an aqueous phase in the interfacial polycondensation is the same as that in the case of the production of the polycarbonate oligomer.

With regard to a reactor to be used in the polycondensation reaction, the reaction can be completed with only one reactor depending on the ability of the reactor. The polycondensation reaction can also be performed by further building a plurality of reactors, such as a second reactor and a third reactor subsequent to the first reactor, as required. A stirring tank, a multiple tower-type stirring tank, a non-stirring tank, a static mixer, a line mixer, an orifice mixer, a pipe, or the like can be used as the reactor to be used in the polycondensation reaction. Those reactors may be arbitrarily combined to be used as a plurality of reactors.

Next, the batch method of the (2) is described.

The method involving causing the alkali aqueous solution of the dihydric phenol and phosgene to react with each other in the presence of the organic solvent to produce the reaction mixture liquid is, for example, as described below. The alkali aqueous solution of the dihydric phenol and the organic solvent are introduced into a stirring tank with a stirring machine, and then the reaction is performed by introducing phosgene under stirring. The introduction of phosgene is typically stopped in the earlier stage of the reaction, and in the latter stage of the reaction, the reaction is typically performed by introducing an additional alkali aqueous solution of the dihydric phenol and an additional alkali. An organic solvent to be added as required, and a terminal stopper, a catalyst, and any other component to be used as required are the same as those in the (1). Conditions, such as a reaction temperature, are also the same as those in the (1).

The reaction mixture liquid containing the polycarbonate is obtained by each of the methods described in the (1) and the (2), but the organic solvent solution containing the polycarbonate to be used in the present invention is obtained as described below. The reaction mixture liquid is separated into an organic phase containing the polycarbonate and an aqueous phase by separating means, such as settled separation or centrifugal separation, and the resultant organic phase containing the polycarbonate is subjected to washing including alkali washing, acid washing, and pure water washing. The organic phase containing the polycarbonate from which impurities, such as an inorganic salt, an alkali component, and an acid component, have thus been removed is used as the "organic solvent solution containing the polycarbonate." The viscosity-average molecular weight (Mv) of the polycarbonate contained in the organic phase is typically from 8,000 to 50,000, preferably from 8,000 to 35,000. Needless to say, the mixed liquid after the respective kinds of washing is separated into an organic phase containing the polycarbonate and an aqueous phase by the separating means described above.

The organic solvent solution containing the polycarbonate separated as the organic phase after the washing described above typically contains 5 mass % to 20 mass % of the polycarbonate. The organic solvent solution containing the polycarbonate at the concentration may be used as it is in the next powdering step, or may be used after having been concentrated so as to contain 20 mass % to 50 mass % of the polycarbonate by performing a treatment, such as heating or decompression, in order that the solution may be efficiently powdered. When the solution is concentrated so as to have such concentration, severe removal of the organic solvent in the powdering step can be prevented, and hence efficient powdering can be performed. A concentrator to be used in the case where the concentration is performed is not particularly limited, and any concentrator may be used as long as the concentrator includes heating and decompressing facilities. The concentrator may be specifically, for example, an instrument, such as a flash drum.

[Powdering Step]

The polycarbonate powder is obtained by powdering the organic solvent solution containing the polycarbonate in the powdering step. A known method can be used as a method powdering the organic solvent solution containing the polycarbonate to provide the polycarbonate powder. Examples of such known method may include: (a) a method involving supplying the organic solvent solution containing the polycarbonate to a stirrer, such as a kneader, removing the organic solvent under, as required, reduced pressure while heating the solution, to powder the solution, and pulverizing the powdered product as required to provide the polycarbonate powder; (b) a method involving loading the organic solvent solution containing the polycarbonate into warm water under stirring, and powdering the mixture to provide the polycarbonate powder; (c) a method involving loading a powdered polycarbonate powder (seed powder) into a stirring tank with a stirring machine in advance, and supplying the organic solvent solution containing the polycarbonate with heating and under, as required, reduced pressure, to provide the polycarbonate powder; and (d) a method involving mixing the organic solvent solution containing the polycarbonate with steam to provide a dispersion liquid of the polycarbonate powder, and then removing water and the organic solvent through heating to provide the polycarbonate powder. The average particle diameter of the polycarbonate powder obtained in the powdering step is desirably set to from 0.15 mm to 2.40 mm, preferably from 0.15 mm to 1.20 mm in order that drying in the next drying step may efficiently progress. To this end, the powder may be pulverized with a crusher or the like as required.

[Drying Step]

The used organic solvent typically remains in an amount as large as from 10 mass % to 50 mass % in the polycarbonate powder obtained in the powdering step. When the polycarbonate powder containing such large amount of the organic solvent is transferred with a pipe, the powder severely adheres to the pipe and hence the following trouble may occur: the pipe is clogged. In addition, when the polycarbonate powder in which the organic solvent remains in a large amount is pelletized with an extruder, the pelletization cannot be performed owing to an influence of the organic solvent remaining in a large amount in some cases. Even when the pelletization can be performed, a pellet having an ordered shape cannot be obtained, or owing to the fact that the organic solvent still remains in the pellet, a molded article is adversely affected in some cases. Therefore, the content of the organic solvent remaining in the polycarbonate powder obtained in the powdering step needs to be finally reduced to at least 0.1 mass % or less. A method involving drying the polycarbonate powder only in one stage is available as a method of reducing the content of the organic solvent remaining in the polycarbonate powder to 0.1 mass % or less. However, in the case where the method is used, when the polycarbonate powder is heated to a temperature close to the glass transition temperature of the polycarbonate, such a problem in that the polycarbonate powder remarkably adheres to a wall surface in a drying machine as described above occurs.

The drying step of the present invention refers to the case where a pre-drying step is performed, and to the case where a post-drying step is performed after the pre-drying step.

<Pre-Drying Step>

In the pre-drying step of the present invention, in order that the organic solvent remaining in the polycarbonate powder obtained in the powdering step may be removed, the temperature at which the polycarbonate powder is dried needs to be set to a temperature lower than the glass transition temperature of the polycarbonate containing 1.5 mass % of the organic solvent by from 5° C. to 15° C. A temperature difference between the glass transition temperature of the polycarbonate containing 1.5 mass % of the organic solvent and the drying temperature becoming less than 5° C. is not preferred because the polycarbonate powder may fuse and adhere to a wall surface in a drying machine to reduce the heat transfer performance of the drying machine, thereby reducing its drying performance. In addition, in the case where a low-molecular weight polycarbonate is produced by switching a grade after the adhesion of a high-molecular weight polycarbonate to the wall surface in the drying machine, when the high-molecular weight polycarbonate that has peeled off is included in the low-molecular weight polycarbonate, a gel occurs in a molded article to adversely affect the quality of the molded article. When the temperature difference between the glass transition temperature of the polycarbonate containing 1.5 mass % of the organic solvent and the drying temperature is more than 15° C., it may become difficult to remove the organic solvent or it may take a long time period to perform the drying, and hence production efficiency reduces.

Herein, the glass transition temperature of the polycarbonate containing 1.5 mass % of the organic solvent refers to a glass transition temperature ($Tg_1$) in a state in which the organic solvent used in the production of the polycarbonate is incorporated at 1.5 mass %. It has been known that when the glass transition temperature is compared to a glass transition temperature ($Tg_0$) in a state in which the organic solvent used in the production of the polycarbonate is not incorporated, a relationship of $Tg_1 < Tg_0$ is established.

The glass transition temperature ($Tg_1$) of the polycarbonate containing 1.5 mass % of the organic solvent can be determined from the following mathematical expression (1) provided by Bueche.

$$Tg_s = \left(1 - \frac{1-\phi_p}{1-\phi_p(1-1/K)}\right)Tg_0 + \frac{1-\phi_p}{1-\phi_p(1-1/K)}Tg_1 \quad (1)$$

In the mathematical expression (1), K represents a constant that varies depending on the kinds of polymers, and represents 2.5 in the case of a polycarbonate. $Tg_s$ represents the glass transition temperature (Tg) of a solvent, and was calculated from a melting point Tm of methylene chloride, i.e., −95° C. because a ratio "$Tg_s/Tm$" is substantially equal to ⅔ in general. $\phi_p$ represents the volume fraction of a polymer and was calculated on the assumption that the polycarbonate powder contained 1.5 mass % of methylene chloride.

The glass transition temperature ($Tg_1$) in a state in which the organic solvent used in the method of producing a polycarbonate of the present invention is incorporated at 1.5 mass % is calculated from the mathematical expression (1). The $Tg_0$ can be measured and determined in conformity with ISO 11357 after the resultant polycarbonate has been dried to be brought into a state of being substantially free of the organic solvent.

In the pre-drying step of the present invention, the content of the organic solvent remaining in the polycarbonate powder after the drying is typically 5 mass % or less, preferably from 1 mass % to 3 mass %. When the content of the organic solvent is set to such value in the pre-drying step, there is no risk that the polycarbonate powder adheres to the wall surface in the drying machine to be used in the pre-drying step owing to fusion or the like. In addition, even when the polycarbonate powder after the drying is dried at a temperature close to the glass transition temperature of the polycarbonate in a post-drying machine, there is a low risk that the polycarbonate powder adheres to a wall surface in the post-drying machine owing to fusion or the like. When the content of the organic solvent in the polycarbonate powder before the drying is set to from 10 mass % to 30 mass % in the pre-drying step, the pre-drying step can be efficiently performed.

A known drying machine can be used as the drying machine to be used in the pre-drying step, and examples thereof may include drying machines, such as a biaxial disc dryer, a paddle-type dryer, a vertical drying machine, and a belt-type drying machine. Each of those drying machines can be used after its inside has been brought into a decompressed state as required. The pre-drying step can be performed under the condition of the drying temperature with one drying machine or a plurality of drying machines.

<Post-Drying Step>

The polycarbonate powder obtained by the pre-drying step typically contains 5 mass % or less, and at least 1 mass %, of the organic solvent. Accordingly, in order that a polycarbonate powder may be obtained for the purpose of pelletizing the powder, the powder is preferably dried by a post-drying step so that the content of the organic solvent may be 1,000 ppm by mass or less, preferably 500 ppm by mass or less, more preferably 300 ppm by mass or less, still more preferably 100 ppm by mass or less. The same drying machine as that in the pre-drying step can be used as a drying machine to be used in the post-drying step. A drying temperature in the post-drying step is a temperature lower than the glass transition temperature ($Tg_0$) of the polycarbonate substantially free of the organic solvent, and is preferably set to a temperature lower than the $Tg_0$ by from 3° C. to 10° C. The setting of the temperature within the range can improve the efficiency with which the polycarbonate powder is dried. In the present invention, the pre-drying step is performed, and hence even when the polycarbonate powder is dried at a temperature relatively close to the glass transition temperature ($Tg_0$) of the polycarbonate in the post-drying step, the adhesion of the polycarbonate powder in the drying machine to be used in the post-drying step can be prevented. The post-drying step can be performed under the condition of the drying temperature with one drying machine or a plurality of drying machines.

The polycarbonate powder obtained after the post-drying step of the present invention is reduced in adhesion amount to each of the wall surfaces in the drying machines to be used in the pre-drying step and the post-drying step. Accordingly, for example, when a low-molecular weight polycarbonate is produced by switching a grade after the production of a high-molecular weight polycarbonate, there is a low risk that the high-molecular weight polycarbonate that has adhered to, for example, a wall surface in a drying machine peels off to be included in the low-molecular weight polycarbonate. As a result, a gel hardly occurs. Specifically, the average number of gels in a film measuring 10 cm by 30 cm, and having a thickness of 0.1 mm, the film being obtained by molding the polycarbonate powder obtained after the post-drying step, can be set to 0.7 or less. As a result, a high-quality molded article can be obtained.

EXAMPLES

The present invention is hereinafter described more specifically by way of Examples. The present invention is not limited by these examples. Measurements and evaluations in Examples and Comparative Examples were performed by the following methods.

<Measurement of Viscosity-Average Molecular Weight (Mv)>

The viscosity-average molecular weight (Mv) of a polycarbonate is calculated from the following expression by using a limiting viscosity [η] determined by measuring the viscosity of a methylene chloride solution at 20° C. with an Ubbelohde-type viscometer.

$$[\eta]=1.23\times10^{-5} \, Mv^{0.83}$$

<Measurement of Content of Remaining Organic Solvent in Polycarbonate Powder>

The content of a remaining organic solvent in a polycarbonate powder was measured with a gas chromatograph [manufactured by Agilent Technologies, Type HP6890], and a FID or a TCD was used as a detector.

<Measurement of Average Particle Diameter of Polycarbonate Powder>

The average particle diameter of a polycarbonate powder was measured as described below. The powder was sieved with sieves having pore diameters of 5 mm, 1,000 μm, 600 μm, 300 μm, 150 μm, and 75 μm. The mass of a component remaining on each of the sieves was measured, and its mass fraction was determined. A particle diameter distribution was determined from the respective mass fractions. In addition, the average particle diameter was determined by calculating the sum of the product of a mass fraction and a pore diameter corresponding thereto.

<Measurement of Glass Transition Temperature ($Tg_0$) of Polycarbonate Powder>

The glass transition temperature ($Tg_0$) of a polycarbonate powder was measured as described below. The resultant polycarbonate was dried to be brought into a state of being substantially free of an organic solvent used at the time of its production (state in which the content of the remaining organic solvent was set to 1,000 ppm by mass or less), and then the measurement was performed in conformity with ISO 11357.

<Measurement of Average Number of Gels>

A film for measurement measuring 10 cm by 30 cm, and having a thickness of 0.1 mm was obtained by using a polycarbonate pellet obtained from a polycarbonate powder and a film molding machine. The number of gels was visually counted and measured by using the film for measurement. With regard to a gel having a minute diameter that was difficult to distinguish from a floating foreign matter with the eyes, the measurement was performed with a polarization microscope (at a magnification of 20).

The measurement was performed for 10 films for measurement, and an average number per film was calculated.

Example 1

A solution of bisphenol A in aqueous sodium hydroxide and phosgene were caused to react with each other in the presence of methylene chloride to produce a polycarbonate oligomer, and the polycarbonate oligomer was subjected to polycondensation to provide a reaction mixture liquid containing a polycarbonate having a viscosity-average molecular weight of 14,500 whose terminals were each stopped with a p-tert-butylphenoxy group. An organic phase containing the polycarbonate was separated from the reaction mixture liquid, and was subjected to a washing step (alkali washing, acid washing, and pure water washing) to provide an organic phase containing a purified polycarbonate (having a polycarbonate content of 13 mass %). Next, the organic phase containing the purified polycarbonate was loaded into a kneader having an internal volume of 3 liters held at a temperature of 90° C., and was kneaded to provide a polycarbonate coarse powder. The polycarbonate coarse powder was pulverized with a crusher at a kneader outlet to provide a polycarbonate powder having an average particle diameter of 0.5 mm. The content of methylene chloride in the polycarbonate powder was measured. As a result, the content was 20 mass %. The glass transition temperature of the polycarbonate in the case where the polycarbonate was substantially free of methylene chloride was 145.4° C. Therefore, the glass transition temperature of the polycarbonate in the case where the polycarbonate contained 1.5 mass % of methylene chloride was calculated to be 133.8° C.

The resultant polycarbonate powder having a methylene chloride content of 20 mass % was dried in a pre-drying step. In the pre-drying step, the polycarbonate powder was introduced at a flow rate of 200 milliliters/min into a biaxial disc dryer having an internal volume of 5 liters. The disc dryer provided with a jacket, and the inside of the disc dryer was heated to 128° C. by passing saturated steam having a temperature of 128° C. through the jacket and a disc. A retention time in the disc dryer was 20 minutes, and the content of methylene chloride in the resultant polycarbonate powder was 1.2 mass %. In addition, the disc dryer was continuously used in the drying for 12 hours, and then the internal status of the disc dryer was observed. As a result, the adhesion of a polycarbonate melt to a wall surface and the disc was not observed.

The resultant polycarbonate powder was transferred from the pre-drying step with a pipe, and was further dried in a post-drying step so that the remaining organic solvent was removed. In the post-drying step, a disc dryer was used as a drying machine, and the drying was performed under the conditions of a drying temperature in the drying machine of 141° C. and a retention time in the drying machine of 4 hours. The content of methylene chloride in the polycarbonate powder after the drying was 20 ppm by mass. Those results are shown in Table 1.

Example 2

Polycarbonate production was performed in the same manner as in Example 1 except that in the pre-drying step of Example 1, the inside of the disc dryer was heated to 124°

C. by passing saturated steam having a temperature of 124° C. through the jacket and the disc. The results are shown in Table 1.

Example 3

In Example 1, a solution of bisphenol A in aqueous sodium hydroxide and phosgene were caused to react with each other in the presence of methylene chloride to produce a polycarbonate oligomer, and the polycarbonate oligomer was subjected to polycondensation to provide a reaction mixture liquid containing a polycarbonate having a viscosity-average molecular weight of 21,500 whose terminals were each stopped with a p-tert-butylphenoxy group. The reaction mixture liquid was treated in the same manner as in Example 1 to provide a polycarbonate powder having a methylene chloride content of 20 mass %. The glass transition temperature of the polycarbonate in the case where the polycarbonate was substantially free of methylene chloride was 151.4° C. Therefore, the glass transition temperature of the polycarbonate in the case where the polycarbonate contained 1.5 mass % of methylene chloride was calculated to be 139.3° C. The polycarbonate powder was dried in a pre-drying step while the inside of the disc dryer was heated to 134° C. by passing saturated steam having a temperature of 134° C. through the jacket and the disc. Polycarbonate production was performed in the same manner as in Example 1 except the foregoing. A post-drying step was performed under a drying condition shown in Table 1. The results are shown in Table 1.

Example 4

In Example 1, a solution of bisphenol A in aqueous sodium hydroxide and phosgene were caused to react with each other in the presence of methylene chloride to produce a polycarbonate oligomer, and the polycarbonate oligomer was subjected to polycondensation to provide a reaction mixture liquid containing a polycarbonate having a viscosity-average molecular weight of 11,500 whose terminals were each stopped with 3-pentadecylphenol (PDP). The reaction mixture liquid was treated in the same manner as in Example 1 to provide a polycarbonate powder having a methylene chloride content of 20 mass %. The glass transition temperature of the polycarbonate in the case where the polycarbonate was substantially free of methylene chloride was 126° C. Therefore, the glass transition temperature of the polycarbonate in the case where the polycarbonate contained 1.5 mass % of methylene chloride was calculated to be 114.9° C. The polycarbonate powder was dried in a pre-drying step while the inside of the disc dryer was heated to 109° C. by passing saturated steam having a temperature of 109° C. through the jacket and the disc. Polycarbonate production was performed in the same manner as in Example 1 except the foregoing. A post-drying step was performed under a drying condition shown in Table 1. The results are shown in Table 1.

Example 5

In Example 1, a solution of bisphenol A in aqueous sodium hydroxide and phosgene were caused to react with each other in the presence of methylene chloride to produce a polycarbonate oligomer. Polycondensation was performed by using the polycarbonate oligomer, and adding an allylphenol terminal-modified polydimethylsiloxane (PDMS) having a number of repetitions of dimethylsiloxane units of 90 at the time of the polycondensation reaction together with a solution of bisphenol A in aqueous sodium hydroxide. Thus, a reaction mixture liquid containing a polycarbonate-polydimethylsiloxane copolymer having a viscosity-average molecular weight of 17,500 whose terminals were each stopped with a p-tert-butylphenoxy group was obtained. The reaction mixed liquid was treated in the same manner as in Example 1 to provide a polycarbonate powder having a methylene chloride content of 20 mass %. The glass transition temperature of the polycarbonate-polydimethylsiloxane copolymer in the case where the copolymer was substantially free of methylene chloride was 142° C., and the polyorganosiloxane content of the copolymer was 6.1 mass %. Therefore, the glass transition temperature of the copolymer in the case where the copolymer contained 1.5 mass % of methylene chloride was calculated to be 130.3° C. The polycarbonate powder was dried in a pre-drying step while the inside of the disc dryer was heated to 125° C. by passing saturated steam having a temperature of 125° C. through the jacket and the disc. Polycarbonate production was performed in the same manner as in Example 1 except the foregoing. A post-drying step was performed under a drying condition shown in Table 1. The results are shown in Table 1.

Example 6

In Example 3, the polycarbonate powder in the biaxial disc dryer having an internal volume of 5 liters used in the pre-drying step was transferred. After that, the polycarbonate powder having a methylene chloride content of 20 mass % obtained in Example 4 (polycarbonate powder obtained by causing a solution of bisphenol A in aqueous sodium hydroxide and phosgene to react with each other in the presence of methylene chloride to produce a polycarbonate oligomer, subjecting the polycarbonate oligomer to polycondensation to provide a reaction mixture liquid containing a polycarbonate having a viscosity-average molecular weight of 11,500 whose terminals were each stopped with 3-pentadecylphenol (PDP), and treating the reaction mixture liquid in the same manner as in Example 1) was introduced into the biaxial disc dryer, and a pre-drying step was performed in the same manner as in Example 4. Further, a post-drying step was also performed. A polycarbonate powder thus obtained was pelletized, and a film for measurement was produced from the pellet with a film forming machine. The average number of gels in the film for measurement was measured. As a result, the average number was 0.3.

Comparative Example 1

Polycarbonate production was performed in the same manner as in Example 1 except that in Example 1, in the pre-drying step, the inside of the disc dryer was heated to 137° C. by passing saturated steam having a temperature of 137° C. through the jacket and the disc. The results are shown in Table 1.

Comparative Example 2

Polycarbonate production was performed in the same manner as in Example 3 except that in Example 3, in the pre-drying step, the inside of the disc dryer was heated to 143° C. by passing saturated steam having a temperature of 143° C. through the jacket and the disc. A post-drying step was performed under a drying condition shown in Table 1. The results are shown in Table 1.

Comparative Example 3

Polycarbonate production was performed in the same manner as in Example 4 except that in Example 4, in the pre-drying step, the inside of the disc dryer was heated to 115° C. by passing saturated steam having a temperature of 115° C. through the jacket and the disc. The results are shown in Table 1.

Comparative Example 4

In Example 1, the pre-drying step was not performed, and only the post-drying step was performed under a drying condition shown in Table 1. The results are shown in Table 1.

Reference Example 1

In Comparative Example 2, the polycarbonate powder in the biaxial disc dryer having an internal volume of 5 liters used in the pre-drying step was transferred. After that, the polycarbonate powder having a methylene chloride content of 20 mass % of Example 4 (polycarbonate powder obtained by causing a solution of bisphenol A in aqueous sodium hydroxide and phosgene to react with each other in the presence of methylene chloride to produce a polycarbonate oligomer, subjecting the polycarbonate oligomer to polycondensation to provide a reaction mixture liquid containing a polycarbonate having a viscosity-average molecular weight of 11,500 whose terminals were each stopped with 3-pentadecylphenol (PDP), and treating the reaction mixture liquid in the same manner as in Example 1) was subjected to a pre-drying step in the same manner as in Example 4. Further, a post-drying step was also performed. A polycarbonate powder thus obtained was pelletized, and a film for measurement was produced from the pellet with a film forming machine. The average number of gels in the film for measurement was measured. As a result, the average number was 0.9.

TABLE 1

| | | Examples | | | | |
|---|---|---|---|---|---|---|
| | | 1 | 2 | 3 | 4 | 5 |
| Properties of organic solvent solution containing purified polycarbonate | Viscosity-average molecular weight of polycarbonate (Mv) | 14,500 | 14,500 | 21,500 | 11,500 | 17,500 |
| | Dihydric phenol constituting main chain of polycarbonate | BPA | BPA | BPA | BPA | BPA, PDMS |
| | Monohydric phenol constituting terminal of polycarbonate | PTBP | PTBP | PTBP | PDP | PTBP |
| Powdering step | Average particle diameter of resultant polycarbonate powder (mm) | 0.5 | 0.5 | 0.9 | 0.3 | 0.6 |
| | Content of organic solvent in polycarbonate powder (mass %) | 20 | 20 | 20 | 20 | 20 |
| Pre-drying step | Glass transition temperature of polycarbonate: $Tg_0$ (° C.) | 145.4 | 145.4 | 151.4 | 126.0 | 142.0 |
| | Glass transition temperature of polycarbonate containing 1.5 mass % of organic solvent: $Tg_1$ (° C.) | 133.8 | 133.8 | 139.3 | 114.9 | 130.3 |
| | Drying temperature (° C.) | 128 | 124 | 134 | 109 | 125 |
| | $Tg_1$ − Drying temperature (° C.) | 5.8 | 9.8 | 5.3 | 5.9 | 5.3 |
| | Content of organic solvent in polycarbonate powder after drying (mass %) | 1.2 | 1.6 | 1.3 | 1.1 | 1.1 |
| | Presence or absence of polycarbonate deposit in drying machine after 12-hour continuous drying (visual observation) | Absent | Absent | Absent | Absent | Absent |
| Post-drying step | Drying temperature (° C.) | 141 | 141 | 147 | 122 | 138 |
| | $Tg_0$ − Drying temperature (° C.) | 4.4 | 4.4 | 4.4 | 4.0 | 4.0 |
| | Content of organic solvent in polycarbonate powder after drying (ppm by mass) | 20 | 50 | 150 | 140 | 100 |

| | | Comparative Examples | | | |
|---|---|---|---|---|---|
| | | 1 | 2 | 3 | 4 |
| Properties of organic solvent solution containing purified polycarbonate | Viscosity-average molecular weight of polycarbonate (Mv) | 14,500 | 21,500 | 11,500 | 14,500 |
| | Dihydric phenol constituting main chain of polycarbonate | BPA | BPA | BPA | BPA |
| | Monohydric phenol constituting terminal of polycarbonate | PTBP | PTBP | PDP | PTBP |
| Powdering step | Average particle diameter of resultant polycarbonate powder (mm) | 0.5 | 0.9 | 0.3 | 0.5 |
| | Content of organic solvent in polycarbonate powder (mass %) | 20 | 20 | 20 | 20 |
| Pre-drying step | Glass transition temperature of polycarbonate: $Tg_0$ (° C.) | 145.4 | 151.4 | 126.0 | 145.4 |
| | Glass transition temperature of polycarbonate containing 1.5 mass % of organic solvent: $Tg_1$ (° C.) | 133.8 | 139.3 | 114.9 | — |

TABLE 1-continued

| | | | | | |
|---|---|---|---|---|---|
| | Drying temperature (° C.) | 137 | 143 | 115 | — |
| | Tg$_1$ – Drying temperature (° C.) | −3.2 | −3.7 | −0.1 | — |
| | Content of organic solvent in polycarbonate powder after drying (mass %) | 2.2 | 1.3 | 2 | — |
| | Presence or absence of polycarbonate deposit in drying machine after 12-hour continuous drying (visual observation) | Present | Present | Slightly present | — |
| Post-drying step | Drying temperature (° C.) | 141 | 148 | 122 | 141 |
| | Tg$_0$ – Drying temperature (° C.) | 4.4 | 3.4 | 4.0 | 4.4 |
| | Content of organic solvent in polycarbonate powder after drying (ppm by mass) | 1,300 | 1,800 | 1,500 | 10,000 |

In Table 1, BPA represents bisphenol A, PDMS represents an allylphenol terminal-modified polydimethylsiloxane having a number of repetitions of dimethylsiloxane units of 90, PTBP represents p-tert-butylphenol, and PDP represents 3-pentadecylphenol.

As is apparent from Table 1, in the method of producing a polycarbonate of the invention of the present application of each of Examples 1 to 5, the polycarbonate powder does not adhere to, for example, the wall surface in the drying machine, and hence the polycarbonate powder can be efficiently dried without any reduction in drying efficiency. In addition, the post-drying to be subsequently performed can also be efficiently performed. In contrast, in each of Comparative Examples 1 to 4, it is understood that the polycarbonate powder adheres to the inside of the drying machine to reduce drying efficiency.

In addition, in Example 6 and Reference Example 1 in each of which a low-molecular weight polycarbonate was produced by switching a grade from a high-molecular weight polycarbonate, it is understood that while the average number of gels in Example 6 was 0.3, the average number of gels in Reference Example 1 was 0.9, and hence the average number of gels increased to deteriorate quality.

INDUSTRIAL APPLICABILITY

The method of producing a polycarbonate of the present invention enables efficient production of a polycarbonate because the method enables efficient removal of an organic solvent in a polycarbonate powder obtained from an organic solvent solution containing the polycarbonate, the solution being obtained by causing an alkali aqueous solution of a dihydric phenol and phosgene to react with each other in the presence of the organic solvent.

The invention claimed is:

1. A method of producing a polycarbonate, comprising:
   a step of causing an alkali aqueous solution of a dihydric phenol and phosgene to react with each other in the presence of an organic solvent to produce an organic solvent solution containing a polycarbonate;
   a powdering step of powdering the organic solvent solution containing the polycarbonate to provide a polycarbonate powder; and
   a pre-drying step of drying the resultant polycarbonate powder to remove the remaining organic solvent,
   wherein a drying temperature in the pre-drying step is set to a temperature lower than a glass transition temperature of the polycarbonate containing 1.5 mass % of the organic solvent by from 5° C. to 15° C.

2. The method of producing a polycarbonate according to claim 1, wherein a content of the organic solvent in the polycarbonate powder obtained in the powdering step is from 10 mass % to 50 mass %.

3. The method of producing a polycarbonate according to claim 1, wherein a content of the organic solvent in the polycarbonate powder after the pre-drying step is from 1 mass % to 3 mass %.

4. The method of producing a polycarbonate according to claim 1, wherein the organic solvent is methylene chloride.

5. The method of producing a polycarbonate according to claim 1, wherein the polycarbonate powder obtained in the powdering step has an average particle diameter of from 0.15 mm to 2.40 mm.

6. The method of producing a polycarbonate according to claim 1, wherein the polycarbonate contained in the organic solvent solution has a viscosity-average molecular weight of from 8,000 to 35,000.

7. The method of producing a polycarbonate according to claim 1, further comprising, after the pre-drying step, a post-drying step of drying the polycarbonate powder.

8. The method of producing a polycarbonate according to claim 7, wherein a content of the organic solvent in the polycarbonate powder obtained after the post-drying step is set to 1,000 ppm by mass or less.

9. The method of producing a polycarbonate according to claim 7, wherein a content of the organic solvent in the polycarbonate powder obtained after the post-drying step is set to 500 ppm by mass or less.

10. The method of producing a polycarbonate according to claim 7, wherein a drying temperature in the post-drying step is set to a temperature lower than a glass transition temperature of the polycarbonate containing 1000 ppm by mass or less of the organic solvent by from 3° C. to 10° C.

11. The method of producing a polycarbonate according to claim 7, wherein an average number of gels in a film measuring 10 cm by 30 cm, and having a thickness of 0.1 mm, the film being obtained by molding the polycarbonate powder obtained after the post-drying step, is 0.7 or less.

12. The method of producing a polycarbonate according to claim 1, wherein the dihydric phenol is bisphenol A.

* * * * *